United States Patent [19]

Bearinger

[11] 4,089,116
[45] May 16, 1978

[54] PAPER HOLDER

[75] Inventor: Wells Stone Bearinger, St. Ann, Mo.

[73] Assignee: Quick Point Pencil Co., Inc., Fenton, Mo.

[21] Appl. No.: 720,142

[22] Filed: Sep. 3, 1976

[51] Int. Cl.² .................. G01B 3/04; G09F 3/18
[52] U.S. Cl. .......................... 33/107 R; 24/67 R; 40/11 R; 211/45
[58] Field of Search ............ 33/107; 211/50, 89, 211/45; 40/11 R, 10 R; 24/67 R, 243 R, 243 P, 138 R

[56] References Cited

U.S. PATENT DOCUMENTS

| 98,831 | 1/1870 | Wilson | 211/50 |
|---|---|---|---|
| 298,354 | 5/1884 | Davis | 40/10 R |
| 992,047 | 5/1911 | Peak | 40/11 R |
| 2,219,596 | 10/1940 | Lundquist et al. | 33/107 R |
| 3,322,381 | 5/1967 | Bubb | 40/10 R |
| 3,325,929 | 6/1967 | Mauchline | 40/11 R |

FOREIGN PATENT DOCUMENTS

| 1,325,735 | 3/1963 | France | 40/11 R |
|---|---|---|---|
| 1,347,704 | 11/1963 | France | 40/10 R |

Primary Examiner—Richard E. Aegerter
Assistant Examiner—John W. Shepperd
Attorney, Agent, or Firm—Gravely, Lieder & Woodruff

[57] ABSTRACT

A paper holder has an upwardly opening slot into which ribs project from each side of the slot. The ribs along the two sides are staggered and alternated with respect to each other so that a piece of paper inserted into the slot will assume a corrugated configuration and will accordingly remain upright in a free standing position. The base of the holder has a straight edge along which a measuring scale exists so that the holder may also be used for measuring and marking.

10 Claims, 4 Drawing Figures

PAPER HOLDER

BACKGROUND OF THE INVENTION

This invention relates in general to a holder and more particularly to a device for holding paper or similar thin flexible material in a desired position.

It is not uncommon for memoranda to be lost or obscured on a desk or table top, particularly when they are written on small pieces of paper. Likewise, unless such memoranda are given positions of prominence, they are often overlooked. One way to give a piece of paper prominence and prevent it from being lost on a desk, is to orient it in an upright position, but this is not easily achieved on most desks.

SUMMARY OF THE INVENTION

One of the principal objects of the present invention is to provide a holder for maintaining a piece of paper, such as a memorandum, in an upright free-standing condition so that the paper assumes a position of prominence in which it is not easily overlooked or lost. Another object is to provide a holder of the type stated which corrugates the paper adjacent to its lower edge so that the remainder of the paper remains upright in a free-standing condition. A further object is to provide a holder of the type stated which has a linear measuring scale embodied in it. An additional object is to provide a holder of the type stated which may be conveniently used as a straight edge. Still another object is to provide a holder of the type stated which is attractive in appearance and inexpensive to manufacture. These and other objects and advantages will become apparent hereinafter.

The present invention is embodied in a paper holder including a base and retaining means on the base for imparting a corrugated configuration to a piece of paper so the paper will not bend easily. The invention also consists in the parts and in the arrangements and combinations of parts hereinafter described and claimed.

DESCRIPTION OF THE DRAWINGS

In the accompanying drawings which form part of the Specification and wherein like numerals and letters refer to like parts wherever they occur.

DETAILED DESCRIPTION

Figure 1:
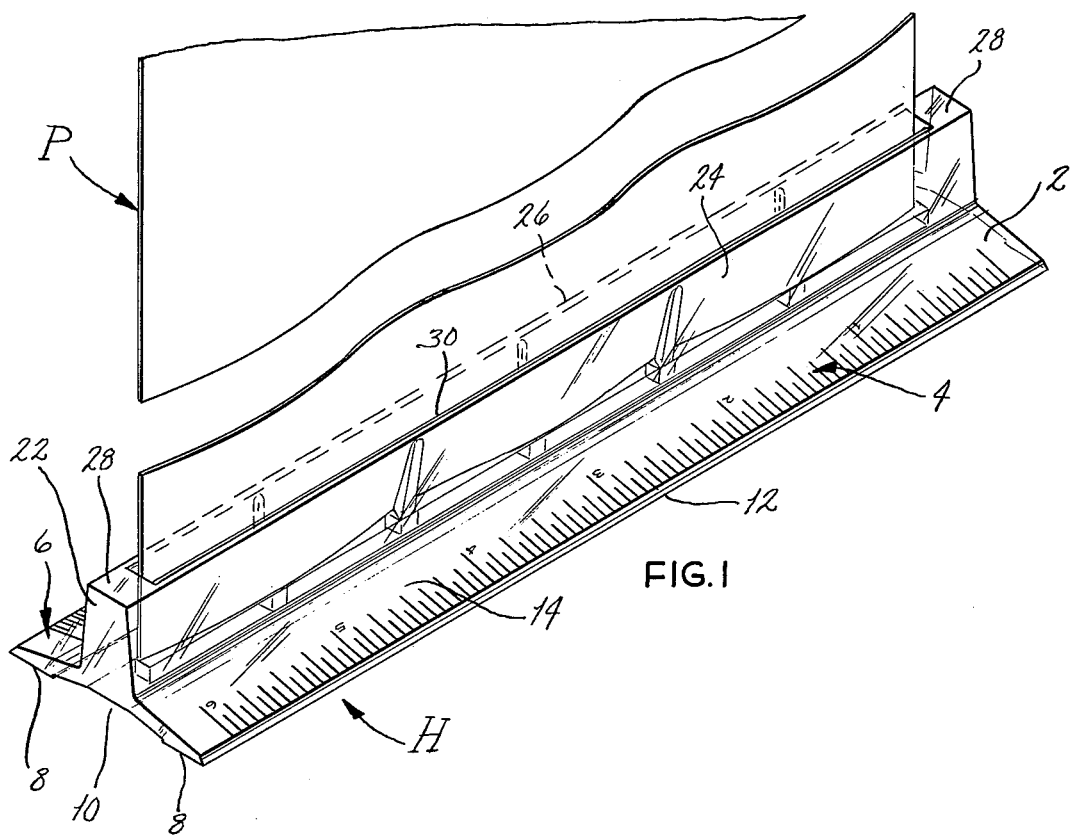
FIG. 1 is a perspective view of the paper holder of the present invention supporting a piece of paper in a free-standing upright position.

Referring now to the drawings, a holder H (FIG. 1) supports a piece of paper P in an upright position on a horizontal surface such as a desk or table top, and when the paper is supported in that manner, it is prominently displayed on the horizontal surface so that it is not easily lost or overlooked. The paper P inserts easily into the holder H and is likewise easily removed from the holder H. Only a small portion of the paper along its lower edge is engaged by the holder H, and that portion which is engaged is corrugated. The remainder is available for notations. The corrugations maintain the paper upright in a free-standing condition.

The holder H includes a base 2 composed of a pair of lateral flanges 4 and 6 which are of identical external configuration. Each flange 4 and 6 is provided with a flat supporting surface 8 (FIG. 3) with the two supporting surfaces 8 being coplanar. Inwardly from the two supporting surfaces 8, the flanges turn slightly upwardly so that a shallow longitudinal recess 10 exists in the base 2 intermediate the two flat supporting surfaces 8.

Each lateral flange 4 and 6 has an outer edge 12 which extends along the flat supporting surface 8 for that flange 4 or 6 and is perfectly straight so that it may be used as a straight edge. Moreover, the two outer edges are parallel and form the outer extremity of the base 2. The flanges 4 and 6 furthermore have flat upper surfaces 14 which are inclined slightly upwardly from the outer edges 12 and hence are located at a slight angle with respect to the flat supporting surfaces 8. The upper surface of the flange 4 has the British measuring scale inscribed on it, while the upper surface of the flange 6 has the metric measuring scale inscribed on it. The former, of course, is divided into inches and the normal fractions thereof, while the latter is divided into centimeters and millimeters.

In addition to the base 2, the holder H further includes a paper retainer 22 which projects upwardly from the base 2 between the two supporting flanges 4 and 6. Thus, the flanges 4 and 6 project laterally from the retainer 22 and maintain it in an upright position. The retainer 22 is composed of a pair of side walls 24 and 26 (FIGS. 2 and 3), which are spaced apart a slight distance for most of their length, and also a pair of end walls 28 which connect the side walls 24 and 26 at their ends. The end walls 28 are flush with the ends of the flanges 4 and 6 and provide a squared-off appearance to the ends of the holder H. The side wall 24 projects upwardly from the flat upper surface 14 of the flange 4, whereas the side wall 26 projects upwardly from the flat upper surface 14 of the flange 6. The two side walls 24 and 26 are spaced apart so that a slot 30 exists between them, and the spacing is somewhat greater at the upper end of the retainer 22 than at the lower end of the retainer 22 (FIG. 3). Hence the inwardly presented surfaces of the two walls 24 and 26 diverge upwardly. Preferably the lower end of the slot 30 is about 7/64 inches wide, whereas the upper end of the slot should be about 3/16 inches wide. In general, for normal paper the slot 30 should not be any narrower than about 1/16 inches and not any wider than about ¼ inches.

Figure 2:
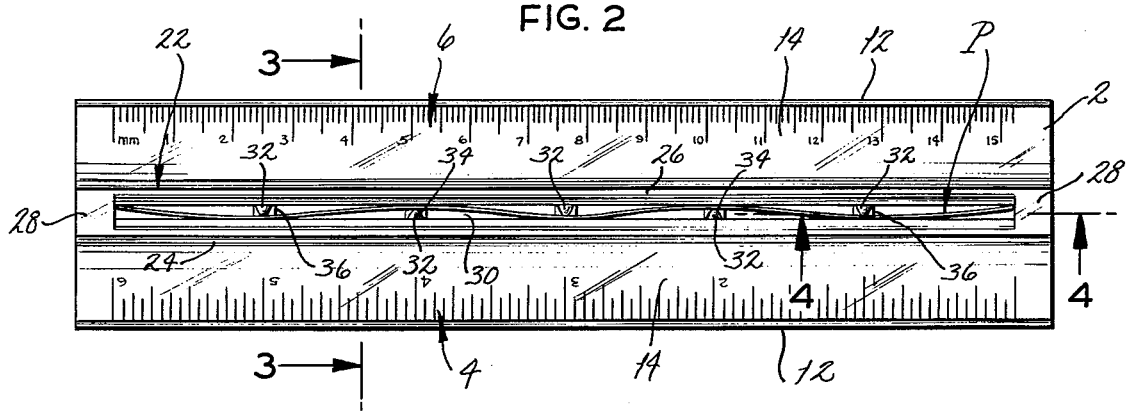
FIG. 2 is a top view of the paper holder.
Figure 3:
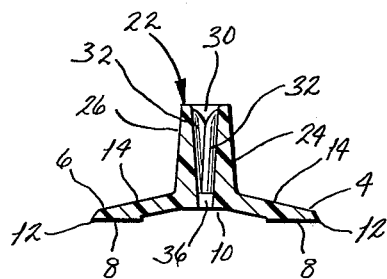
FIG. 3 is a transverse sectional view taken along line 3—3 of FIG. 2.

Projecting into the slot 30 from the two side walls 24 and 26 are corrugating ribs 32, each of which is beveled along its sides to form a somewhat rounded inner edge 34 within the slot 30 (FIG. 2). Near its upper margin the inner edge turns outwardly in a gentle curve and merges into the side wall 24 or 26 from which it projects near the top margin for the side wall (FIG. 3). The ribs 32 on the walls 24 and 26 are equally spaced and the ribs 32 on the wall 24 are staggered with respect to the ribs 32 on the wall 26 (FIG. 2). Thus, along the slot 30, the ribs 32 alternate from the one side wall 24 to the other side wall 26. Each rib 32 projects beyond the longitudinal center plane of the slot 30, except at the curved upper end of its rounded inner edge 34, with the amount of the projection being greatest at the lower end of the slot 30 and becoming progressively less upwardly therefrom. The maximum projection of each rib 32 beyond the center plane of the slot 30 should be between 1/64 and ¼ inches.

Figure 4:
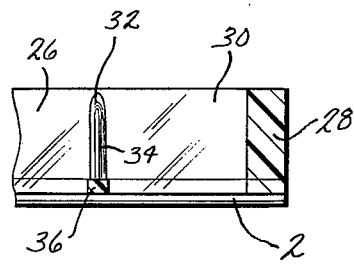
FIG. 4 is a fragmentary sectional view taken along line 4—4 of FIG. 2.

At the bottom of each rib 32 (FIGS. 2-4) is a spanner 36 which bridges the slot 30 and joins the two side walls 24 and 26 on each side of it. The spanners 36 prevent the walls 24 and 26 from moving together and thereby maintain the dimensional stability of the slot 30.

The holder H is preferably injection molded from a suitable thermoplastic resin. The diverging inwardly presented surfaces of the side walls 24 and 26 provide sufficient draft angles to remove the mold core which is used to form the slot 30.

OPERATION

The holder H rests on a horizontal surface, such as a desk top or table top, with its supporting flanges 4 and 6 resting on the supporting surface. Indeed, the entire holder rests on the planar supporting surfaces 8 which extend along the undersides of the two supporting flanges 4 and 6. When the holder H is so disposed, its retainer 22 is presented upright and the slot 30 therein opens upwardly. Moreover, the center plane of the slot 30 is located perfectly vertical.

To position paper P, which may be a note or memorandum, in a free-standing position, the paper P is inserted into the upper end of the slot 30 and moved downwardly. In this regard, the paper P enters the slot 30 with relative ease since the slot 30 is quite a bit wider than the paper P and furthermore the upper ends of the edges 34 for the ribs 32 are curved outwardly toward the walls 24 and 26 and consequently do not interfere with the entry of the paper P. Indeed, the curved upper ends of the ribs 32 deform the paper P, at least at its lower end, into an undulated or corrugated configuration (FIG. 2) as the paper P is advanced, since the edges 34 of the ribs 32 are located beyond the center plane of the slot 30. As the paper P descends, the corrugations become more pronounced. The paper P is moved downwardly until its lower margin comes against the spanners 36 which bridge the lower end of the slot 30.

When the paper P is fully inserted into the slot 30, the corrugations imparted to its lower end are sufficient in magnitude to maintain the remaining portion of the paper P in an upright position (FIG. 1). Hence the major portion of the paper P projects upwardly above retainer where it is displayed prominently and is easily visible.

Without the paper P, the holder H is conveniently used as a measuring scale and straight edge. In this regard, the upstanding retainer 22 serves as a convenient grip for holding the holder H while the scale on either one of the supporting flanges 4 or 6 is used for measuring purposes or to guide a marking implement when a straight line is desired.

This invention is intended to cover all changes and modifications of the example of the invention herein chosen for purposes of the disclosure which do not constitute departures from the spirit and scope of the invention.

What is claimed is:

1. A holder for supporting a piece of paper or other thin flexible sheet material in an upright position, said holder comprising: a base capable of resting in a stable condition on a horizontal surface; and a paper retainer projecting upwardly from the base and including a pair of spaced apart side walls which define an upwardly opening slot with means for joining the sidewalls at the bottom of the slot and further including a plurality of generally vertical ribs on each of the walls with the ribs on the one wall being offset and alternated with respect to the ribs on the other wall, each rib projecting generally perpendicularly away from the bottom of the slot and also extending into the slot beyond the center plane for the slot with the spacing between each rib and the opposite wall being greater at the top of the slot than at the bottom of the slot, whereby a piece of paper is easily inserted into the slot and as it is moved downwardly will acquire a plurality of vertically directed corrugations so as to remain in an upright disposition in spite of being quite limber.

2. A holder according to claim 1 wherein the base includes a flange which projects laterally from the retainer and has an exposed straight edge spaced from the retainer and a linear measuring scale along the straight edge, whereby the flange may be used for marking and for making linear measurements.

3. A holder according to claim 1 wherein each rib is wedge-shaped in cross section with the apex of the wedge being directed toward the side wall opposite to the wall from which the rib projects, so that the paper bears against the apexes of the ribs.

4. A holder according to claim 1 wherein the ribs are curved outwardly at the upper end of the slot into which the material is inserted so that the end of the material which is inserted into the slot is progressively deformed into the corrugated configuration.

5. A holder according to claim 1 and further comprising means spanning the slot at the lower ends of the ribs to limit the extent the paper may be inserted into the slot.

6. A holder according to claim 1 wherein the bottom of the slot is open and the means joining the sidewalls includes spanners which bridge the space between the two side walls and limit the distance the pieces of paper may be inserted into the slot.

7. A holder according to claim 6 wherein the spanners are at the lower ends of the ribs.

8. A holder according to claim 1 wherein the paper retainer further includes upright end walls connecting the side walls at the ends of the slot so as to close the ends of the slot, whereby the paper must be inserted downwardly into the retainer from the open upper end of the slot.

9. A holder for supporting a piece of paper in a generally upright position, said holder comprising: a base capable of supporting the holder in a stable condition on a horizontal surface and having at least one flange provided with an outwardly exposed straight edge and a linear measuring scale along the straight edge, whereby the flange may be used for guiding a marking implement and for making linear measurements; and a retainer projecting upwardly from the base and including a pair of upright side walls which are spaced apart so that an upwardly opening slot exists between those walls, upright ribs projecting from the side walls into the slot and terminating beyond the vertical center plane of the slot, the ribs on the one wall being offset and alternated with respect to the ribs on the other wall such that a piece of paper inserted into the slot will assume a corrugated configuration with the individual corrugations extending vertically, each rib at its upper end being flared outwardly toward the side wall from which it projects to facilitate entry of the piece of paper into the slot, and upright end walls connecting the side walls at the ends of the slot so as to close the ends of the slot, whereby the piece of paper can be inserted into the slot only from the open upper end of the slot.

10. A holder according to claim 9 wherein the base has two flanges which project away from each other and the retainer projects upwardly from the base between the two flanges thereon, the straight edge and the scale being on at least one of the flanges and the flanges having coplanar bottom surfaces.

* * * * *